United States Patent [19]
Pinckaers

[11] 3,817,453
[45] June 18, 1974

[54] SOLID STATE THERMOSTAT WITH DROOP COMPENSATION

[75] Inventor: B. Hubert Pinckaers, Edina, Minn.

[73] Assignee: Honeywell Inc., Minneapolis, Minn.

[22] Filed: Jan. 8, 1973

[21] Appl. No.: 321,504

[52] U.S. Cl............... 236/68 C, 219/511, 317/131
[51] Int. Cl. ......................................... G05d 23/30
[58] Field of Search ........ 219/511; 236/68 B, 68 C; 317/131 X; 307/310 X

[56] References Cited
UNITED STATES PATENTS
2,935,657  5/1960  Thunberg, Jr................ 236/68 B X
3,666,973  5/1972  Hulsman, Jr....................... 307/310

Primary Examiner—William E. Wayner
Attorney, Agent, or Firm—Lamont B. Koontz; Alfred N. Feldman

[57] ABSTRACT

A solid state thermostat which has a temperature compensating arrangement for the heat generated by the output solid state triac. The temperature compensating arrangement eliminates the droop or offset that would otherwise be created by the heat from the solid state switch affecting the temperature sensor, shown as either a negative or a positive temperature coefficient temperature sensitive resistor.

10 Claims, 3 Drawing Figures

PATENTED JUN 18 1974　　　　　　　　　　　　　　　　　　　3,817,453

SOLID STATE THERMOSTAT WITH DROOP COMPENSATION

BACKGROUND OF THE INVENTION

Solid state thermostats that utilize solid state output switches generate heat within the switch when the switch is carrying current that can adversely affect the operation of the thermostat. Numerous means for disposing or removal of this heat have been proposed. Various heat sink or removal of this heat have been proposed. Various heat sink or "chimney effect" devices, as well as, the physical removal of the solid state switch device to another location have been proposed. These designs all require that the configuration of the thermostat be dictated by the heat removal characteristics, rather than by the necessary aesthetic and other functions of the thermostat. A solid state thermostat circuit is disclosed in complete detail in a U.S. Pat. No. 3,694,663 to Pinckaers, and is assigned to the assignee of the present invention. This type of thermostat could be incorporated within the present invention.

SUMMARY OF THE INVENTION

The present invention is directed to a solid state thermostat in which a second temperature responsive thermistor or element is mounted in the bridge that controls the thermostat, and which is in a heat exchange relationship with the output solid state switch. The heat transfer from the output solid state switch thereby changes the resistance of the associated thermistor and this thermistor is connected in the bridge so as to compensate for the heat generated and transferred to the normal room sensing thermistor in a separate leg of the bridge. The degree of compensation can be adjusted by the selection of components so that the offset or droop is reduced or completely eliminated.

DESCRIPTION OF THE PREFERRED EMBODIMENT

Figure 1:
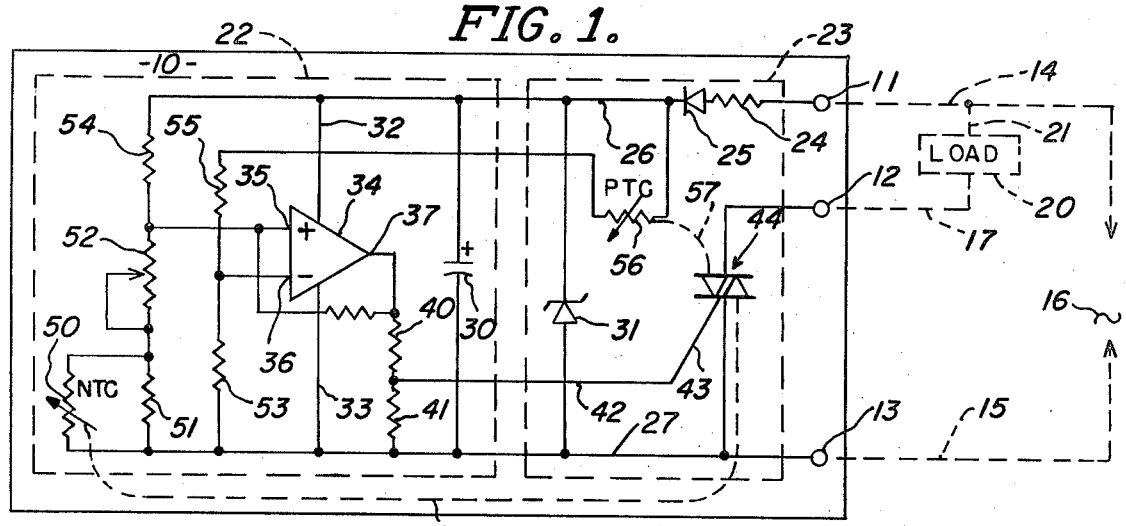
FIG. 1 is a schematic drawing of a three wire thermostat.

The schematic diagram of the solid state thermostat of FIG. 1 includes three terminals, 11, 12 and 13 of the thermostat means generally shown at 10. Terminals 11 and 13 are adapted to be connected by conductors 14 and 15 to a source of electric power 16. Terminal 12 is adapted to be connected through a conductor 17 to a load means 20 and a further conductor 21 so that the load can be energized, as will be subsequently noted. The source of power, conductors, and load means 20 form no part of the present invention and are a conventional load and energizing arrangement for a thermostat. The load 20 can be either a heating or cooling load, but in the disclosed embodiment the load will be considered as a heating load, such as a furnace.

The thermostat 10 includes two separate thermally located sections indicated at 22 and 23. This thermal separation can be accomplished merely by the location of the components within a conventional thermostat, or can be accomplished by the placement of thermal separating arrangement means. The reason for the thermal separation of the two sections will be brought out after a description of the preferred embodiment.

Connected to terminal 11 is a dropping resistor 24 and a diode 25 to provide direct current of a pulsating nature on conductors 26 and 27. Conductor 27 is in turn connected to terminal 13. Connected across the conductors 26 and 27 are a filter capacitor 30 and a voltage regulating zener diode 31. The arrangement just described provides a regulated direct current potential on conductors 26 and 27 for the balance of the circuitry.

Connected by conductors 32 and 33 across the capacitor 30 is an amplifier means 34, that is schematically shown. The amplifier means 34 can be any convenient amplifier but is preferably an operational amplifier of conventional design. The amplifier means 34 has input terminals 35 and 36 which have been designated with polarity symbols. The amplifier has an output 37 and upon a positive signal occurring between the terminals 35 and 36, the output 37 rises to the potential on conductor 32 and allows current to flow through a pair of output resistors 40 and 41. Connected across the resistor 41 is a conductor 42 and the conductor 27. Conductor 42 is connected to a gate 43 of a solid state switch generally disclosed at 44. Solid state switch 44 is specifically disclosed as a triac. The triac 44 is connected across the terminals 12 and 13 and when the triac 44 is conducting, the terminals 12 and 13 are for all practical purposes shorted together. This applies the full potential of the source 16 across the load 20. It is also understood that all solid state switches when carrying current generate heat. This heat, if uncompensated for, causes the thermostat 10 to droop or have an offset. Thermostat droop for a heating control thermostat refers to a decrease in actual space termperature relative to the thermostat setpoint in order to keep the thermostat switch just "on." If the heat from the triac 44 is substantial, and if it is uncompensated for, the thermostat 10 senses the heat and is satisfied at a level turning the load 20 "off" before it should be deenergized. This type of droop can amount to 4 or 5 degrees in a solid state thermostat if no compensation arrangement is provided. The present invention provides for compensation of this internally generated heat. The compensation arrangement will be described in connection with the input circuits for the amplifier means 34.

An ambient temperature sensor or temperature responsive element 50 is disclosed as a negative temperature coefficient thermistor paralleled by a linearizing resistor 51, along with a setpoint resistor 52, and bridge resistors 53, 54, and 55. The bridge circuit is completed by a second temperature responsive element 56, that is disclosed as a positive temperature coefficient thermistor. The element 56 is in a heat exchange relationship 57 with the triac 44. The heat exchange relationship 57 can be accomplished by mounting the thermistor 56 in the proximity of the triac 44 or by actually mounting it in direct contact with the triac 44. The degree of heat exchange and the configuration are a matter of design selection to accomplish the desired results and have not been shown in detail.

The negative temperature coefficient thermistor 50, and the resistors 52 through 56 form a Wheatstone bridge configuration, and in their broader sense are a temperature responsive voltage divider means connected between the terminals 11 and 13 of the thermostat 10.

OPERATION

Electric power is supplied on conductors 14 and 15 to the thermostat 10. The capacitor 30 takes on a charge indicated by the polarity designation. The voltage across the capacitor 30 is supplied to the amplifier means 34 and to the bridge. The temperature responsive element 50 normally causes the bridge to be in balance when the thermostat 10 is at the temperature selected by the set point 52. If the system is a heating system, and the temperature drifts down to the point where the negative temperature coefficient thermistor 50 causes the bridge to become unbalanced such that a positive signal is applied between the terminals 35 and 36 of amplifier 34, the amplifier 34 switches on. When the amplifier 34 switches, the output 37 is in effect connected to the positive conductor 32 and a voltage is developed across resistors 40 and 41. The voltage across the resistor 41 gates the triac 44 into conduction which then shorts the terminals 12 to 13 energizing a load 20. This operation starts the load 20, which has been indicated as a furnace, into operation. At the same time the current flowing through the triac 44 causes a self-generated heat which is conducted to the positive temperature coefficient thermistor 56 and as indicated at 60 to the thermistor 50. If the resistor 56 were not temperature responsive and associated with the triac 44, the heat traveling between the solid state switch means 44 and the thermistor 50 would cause a substantial droop. In effect, the negative temperature coefficient thermistor 50 would sense heat in the thermostat that had not reached the room in which the thermostat 10 was located. The thermistor 50 would then cause the bridge to become balanced prior to the time that the room had reached the proper temperature. This function is compensated for by the heat transfer 57 to the positive temperature coefficient thermistor 56. The heat transferred to thermistor 56 keeps the bridge unbalanced so that the negative temperature coefficient thermistor 50 does not cause the system to rebalance prematurely. The selection of the size of the thermistors 50 and 56 are arranged so that the thermostat has substantially no droop and the heat transfer between the triac 44 and the thermistors 50 and 56 allows for a convenient arrangement within the thermostat 10 without any need of external heat dissipating devices or arrangements.

The configuration of FIG. 1 has been used as a means of disclosing the present invention in a three terminal type of thermostat. This same concept can be applied to any type of thermostat which uses a solid state output switch or triac 44.

Figure 2:
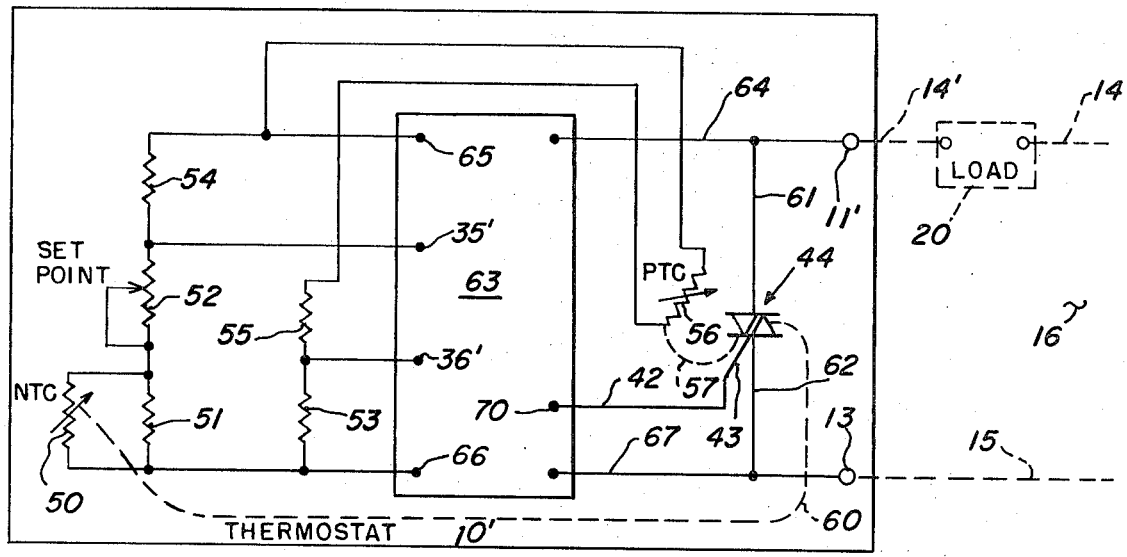
FIG. 2 is a schematic diagram of a two wire thermostat.

FIG. 2 discloses a thermostat 10' utilizing the present invention in a two terminal or two wire type of thermostat. Identical reference numerals will be used to correspond with FIG. 1 where the item is identical. A source of power is supplied to a load 20 between conductors 14, 14' and 15. Conductor 14' is connected to a terminal 11' while conductor 15 is connected to terminal 13. A triac 44 having a gate 43 is again connected so as to energize the load 20 by being connected by conductors 61 and 62 across the terminals 11' and 13. The positive temperature coefficient thermistor 56 is again disclosed in a heat exchange relationship 57 with the triac 44. The positive temperature coefficient thermistor 56 is included in a bridge including the resistors 55, 53, 51, 52, 54, and the negative temperature coefficient thermistor 50. The negative temperature coefficient thermistor 50 again is used as a room temperature sensor and is in a slight heat exchange relationship 60 with the triac 44. The output of the bridge, made up of the previously noted resistors, is connected to terminals 35' and 36' of an amplifier means generally disclosed at 63. The amplifier means 63 can be of any convenient type. For details of one specific type of amplifier arrangement for a thermostat, reference can be made to the U.S. Pat. No. 3,694,663 that has been previously mentioned. The amplifier means 63 is connected by conductor 64 to terminal 11' and by terminals 65 and 66 to supply power to the previously mentioned bridge. A conductor 67 completes the connection of the amplifier means to terminal 13.

Amplifier means 63 has an output terminal 70 connected by conductor 42 to the gate 43 of the triac 44.

OPERATION FIG. 2

With the arrangement disclosed in FIG. 2, if it is assumed that the room temperature sensor 50 indicates that there is no need to energize the load means 20, the output at terminals 35 and 36 are such that the amplifier means 63 does not provide an output on conductor 42 to the gate 43 of the triac 44.

In the event that the temperature at the thermostat 10' drops sufficiently to unbalance the bridge and provide a signal between terminals 35' and 36' to activate the amplifier 63, an output signal is provided on conductor 42 to trigger the conduction of the triac 44. The operation of triac 44 shorts the terminal 11' to terminal 13 thereby energizing the load means 20 across the source of power 16. The conduction current through the triac 44 generates a heat in triac 44 that is transmitted both to the positive temperature coefficient thermistor 56 and to the room sensor 50. The amount of heat conducted to the positive temperature coefficient thermistor 56 is substantial, while the heat conducted to the negative temperature coefficient thermistor 50 is quite slight. The heat conducted to the positive temperature coefficient thermistor 56 causes a change in the bridge balance in a direction so that the heat being generated by the triac 44 that affects the negative temperature coefficient thermistor 50 is offset so as to prevent droop in the control system. A detailed discussion of the operation of amplifier 63 will not be provided in view of the fact that its details can be found in the U. S. Pat. No. 3,694,663.

Figure 3:
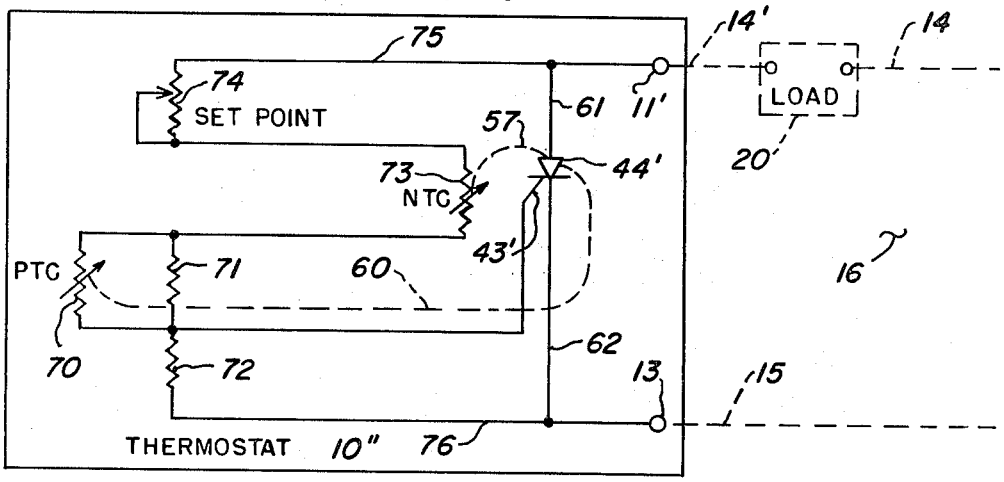
FIG. 3 is a highly simplified version of the two wire thermostat concept.

A highly simplified form of the invention is disclosed in FIG. 3. The thermostat 10'' disclosed in FIG. 3 is a very highly simplified form of the invention. This form is primarily disclosed as a means of showing the nature of the invention rather than showing a version that would be placed on sale, except where a thermostat having a rather wide control range might be used.

Source of power 16 is again disclosed with conductors 14, 14', and 15 which connect the load means 20 to the thermostat 10''. Conductor 14' is connected to terminal 11' while conductor 15 is connected to terminal 13. In this particular thermostat the operation is a half wave type of operation and therefore the conductors 61 and 62 connect to a silicon controlled rectifier 44'. The silicon controlled rectifier again has a gate 43' which is used to cause the silicon controlled rectifier 44' to be gated into conduction. The silicon controlled rectifier 44' has a heat conduction path 60 to a positive temperature coefficient thermistor 70, which in this case is used as a room temperature sensor. A linearizing resistor 71 is again provided along with a gating resistor 72 which is connected across the gate 43' and output conductor 62 of the silicon controlled rectifier 44'. In the version disclosed in the present figure, the heat transfer 57 from the silicon controlled rectifier 44' is to a negative temperature coefficient thermistor 73. The thermistor 73 is in the heat exchange relationship with the silicon controlled rectifier 44' in a fashion similar to the positive temperature coefficient thermistor and the triac previously disclosed. A setpoint resistor 74 completes the resistive network needed for the present invention. The set point resistor is connected by conductor 75 to terminal 11' while resistor 72 is connected by conductor 76 to terminal 13.

OPERATION OF FIG. 3

In the device disclosed in FIG. 3, a bridge is not utilized, but a simple temperature responsive voltage divider means is provided. The voltage divider means is made up of the set point resistor 74, the negative temperature coefficient thermistor 73, the parallel combination of the positive temperature coefficient thermistor 70 and resistor 71, and resistor 72.

When the thermostat 10" is satisfied, the resistance value of the positive temperature coefficient thermistor 70 and the negative temperature coefficient thermistor 73 is such that insufficient voltage is generated across the resistor 72 to gate the silicon controlled rectifier 44' into conduction. When the thermostat 10" is exposed to an ambient temperature that is below the value set in at setpoint 74, the resistance of the positive temperature coefficient thermistor 70 drops sufficiently to allow current flow in the voltage divider means such that a voltage is developed across resistor 72 that is sufficient to trigger the silicon controlled rectifier 44' into conduction. This conduction will last for the balance of the half cycle thereby allowing current to flow from terminal 11' to terminal 13 through the load 20.

Once again the heat generated by the silicon controlled rectifier 44' is transferred to the negative temperature coefficient thermistor 73 to tend to balance out the affect of the heat transmitted to the positive temperature coefficient thermistor 70 from the operation of the silicon controlled rectifier 44'.

It is apparent from the simplified schematic arrangement of FIG. 3 that the present invention could be applied to any number of configurations of solid state thermostat configurations. The invention of the present application has been disclosed in three different possible configurations and these are by way of example only. The scope of the invention is defined only by the appended claims.

The embodiments of the invention in which an exclusive property or right is claimed are defined as follows:

1. In a thermostat, including: terminal means adapted to connect said thermostat to a source of electric power and a load to be controlled; solid state switch means connected to said terminal means so that said load is energized when said solid state switch means is in a conducting state; said solid state switch means generating heat upon carrying electric current in said conducting state; temperature responsive voltage divider means connected to said terminal means to receive said electric power to control the operation of said solid state switch means; said voltage divider means including at least two temperature responsive elements; and a first said temperature responsive elements being in heat exchange relationship with said solid state switch means to adjust the operation of said thermostat to correct for droop caused by said generated heat affecting a second of said temperature responsive elements.

2. In a thermostat as described in claim 1 wherein said temperature responsive elements are temperature responsive resistors.

3. In a thermostat as described in claim 2 wherein said temperature responsive voltage divider means includes a bridge with said temperature responsive resistors in two different legs of said bridge.

4. In a thermostat as described in claim 3 wherein said temperature responsive resistors have opposite temperature responsive characteristics.

5. In a thermostat as described in claim 4 wherein said temperature responsive resistors are thermistors.

6. In a thermostat as described in claim 5 wherein said thermistor in heat exchange relationship with said solid state switch means is a positive temperature coefficient thermistor and said second of said thermistors is a negative temperature coefficient thermistor.

7. In a thermostat as described in claim 6 wherein said solid state switch means is a triac.

8. In a thermostat as described in claim 7 wherein said temperature responsive voltage divider means further includes solid state amplifier means energized from said terminal means and is responsive to said bridge with a bridge output connected to control said triac.

9. In a thermostat as described in claim 2 wherein said temperature responsive voltage divider means further includes solid state amplifier means energized from said terminal means and which has an output responsive to said voltage divider means to control said solid state switch means.

10. In a thermostat as described in claim 9 wherein said solid state switch means is a triac.

* * * * *